Sept. 28, 1948.  J. CLIVE  2,450,370
AUTOMOBILE HEADLAMP CONTROL
Filed March 17, 1947  2 Sheets-Sheet 1
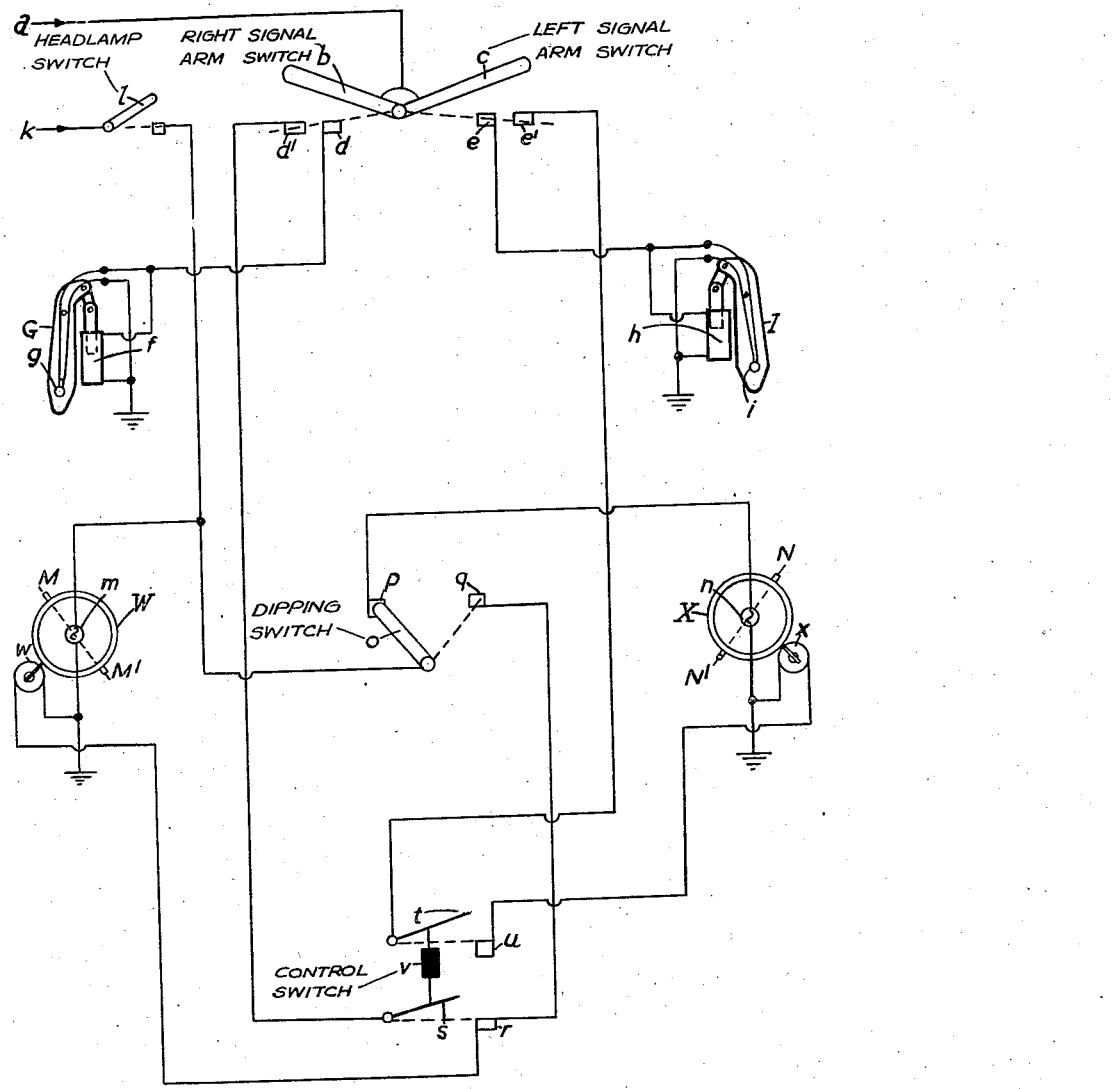
Inventor
James Clive
By Emery Holcombe & Blair
Attorneys

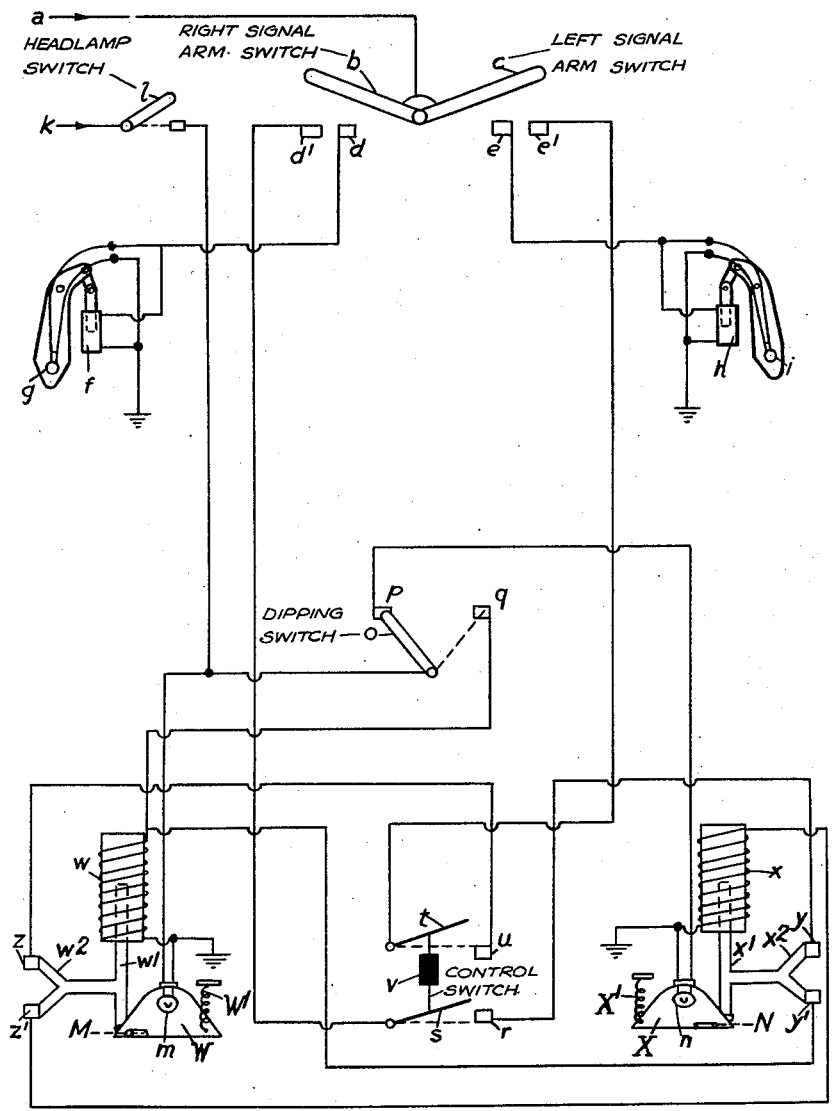

Patented Sept. 28, 1948

2,450,370

UNITED STATES PATENT OFFICE 2,450,370

AUTOMOBILE HEAD LAMP CONTROL

James Clive, Ewhurst, Guildford, England

Application March 17, 1947, Serial No. 735,106
In Great Britain April 9, 1946

5 Claims. (Cl. 177—337)

This invention relates to control systems for turning indicators or signal arms and for the headlamps of automobiles. Hitherto it has been usual to provide a switch for closing the circuit of either the right or left signal arm when a turn is intended, and a separate "dipping" switch operated by hand or foot for "dipping" the headlights on approaching other vehicles on the road. Such "dipping" generally involves switching out of circuit the left headlamp and swivelling the reflector of the right headlamp by means of a solenoid so that it throws the beam of light from this headlamp toward the right, and frequently at a lower inclination, so as to prevent blinding of the drivers of approaching vehicles by headlamp glare.

It is the principal object of this invention to adapt such a system of wiring so that the driver, if he so desires, can close a control switch causing the operation of the signal switch also to effect swivelling of the light beam of the appropriate headlamp toward the right or left, according as the intended turning movement is toward the right or left, whereby the light of the headlamp on the side toward which a turn is to be made will be directed toward that side and will illumine the side road as the vehicle approaches it. It is also an object of the invention to permit operation of a dipping switch as usual for reducing glare from the headlamps in the direction of approaching vehicles, whether the control by the signal switch is in operation for swivelling the light of either headlamp or not.

These and other objects are attained according to the present invention by providing both headlamps with reflectors which can be turned so as to "dip" the light, the reflector of the left headlamp dipping towards the left, and that of the right headlamp towards the right. Then a switch is provided under the control of the operator by which, when desired, he can connect the contacts of the signal arms to the solenoids which swivel the headlamp reflectors so that when either signal arm has its circuit closed the circuit of the corresponding solenoid is closed to operate the reflector and to cause the beam of the headlamp on the side towards which a turn is contemplated, as indicated by the signal arm, to be deflected towards that side ready to illuminate the side road into which the vehicle is to be turned. This enables the driver to see the turning and to observe traffic in a side road where headlamps straightforwardly directed would give no adequate illumination. The usual dipping switch may also be retained for dealing with approaching traffic, this switch being operated by hand or by foot to cut out the left headlamp and to operate the solenoid for dipping the reflector of the right headlamp whenever required independently of the operation of the signal switch.

The invention is illustrated in the accompanying drawings, in which Figures 1 and 2 are circuit diagrams showing two variations of the control circuits according to the invention. Each diagram is drawn as if seen from the front of an approaching vehicle, $m$ representing the right headlamp and $n$ the left headlamp.

Referring first to Figure 1, $a$ is a lead from a source of current such as the battery of a car, to the two arms $b$ and $c$ of a signal switch. When the switch is turned to one side its arm $b$ rests on contacts $d$ and $d^1$, and when turned to the other side its arm $c$ rests on contacts $e$ and $e^1$. Contact $d$ is connected as usual to the coil $f$ which operates the right signal arm G, and the lamp $g$ which illumines this arm, the return circuit from these being through ground, i. e. in this case the frame of the vehicle. The contact $e$ is similarly connected to the operating coil $h$ and the lamp $i$ of the left signal arm I. The contact $d^1$ is also connected to a switch arm $s$, and the contact $e^1$ to a switch arm $t$ of a control switch operated by the knob $v$, whereby the two arms can be simultaneously operated to close on their contacts $r$ and $u$. The contact $r$ is connected to the solenoid $w$ which swivels toward the right, in the usual manner, the reflector W of the right headlamp $m$ about the axis $MM^1$, while the contact $u$ is connected to the solenoid $x$ which operates the reflector X of the left headlamp $n$, swivelling it towards the left, about the axis $NM^1$. Current for the headlamps is supplied from a lead $k$ through a switch $l$ connected directly to the right headlamp $m$ and through a "dipping" switch $o$ and contact $p$ to the left headlamp $n$. When the dipping switch $o$ is operated it is moved over on to contact $q$ connected to contact $r$, and the solenoid $w$.

When signals are to be given by the signal arms only, and the headlamps are not in use, the connections are as shown in full lines in the diagram, the switch of the signal arms being turned towards one side or other according as the contacts of the right or left signal arms are to be closed. As the control switch $s$, $t$ is open no connection is made to the solenoids $w$ and $x$. If the headlamps are to be switched on, the switch $l$ is closed, and then the ordinary dipping operation can be effected whenever required by operating the switch $o$ so as to move it on to contact $q$, which cuts out the left headlamp $n$ and operates the solenoid $w$ of the right headlamp $m$, swivelling its beam of light toward the right.

If, however, it is desired that the beam of light from the right or the left headlamp shall swivel whenever the corresponding signal arm is operated, the control switch $s, t$ is closed. Then if the signal switch is operated so that arm $c$ rests on contacts $e$ and $e^1$ the left signal arm is raised by coil $h$ and illumined by lamp $i$ and simultaneously current flows through the arm $t$ and contact $u$ to the solenoid $x$ whereby the reflector X of the left headlamp $n$ is turned towards the left, causing the beam of light from this headlamp to swivel ready for illuminating a lefthand side road as the vehicle turns into it. Similarly, if the signal switch is operated to close its arm $b$ on contacts $d$ and $d^1$, the right signal arm is raised by coil $f$ and illumined by lamp $g$, while current also flows through arm $s$ and contact $r$ to the solenoid $w$ which turns the reflector W of the right headlamp $m$, swivelling the beam of light towards the right.

The ordinary dipping switch $o$ can be operated in the usual manner while the control switch $s, t$ is closed, because when the arm $o$ of the dipping switch is moved on to contact $q$ it cuts the left headlamp $n$ out of circuit, and brings the solenoid $w$ of the right headlamp into circuit irrespective of the position of the control switch $s, t$.

It will be realised that any type of dipping switch may be used at $o$, such for example as one which, when first pressed by foot or by hand, moves over from contact $p$ to contact $q$, and when next pressed moves back again to contact $p$. Again, the signal switch $b, c$ may be of any desired type provided that by turning an arm towards one side or other it will close contacts which operate the signal arms at the appropriate sides of the vehicle, and will also supply current to the contact arms of the control switch such as $s, t$.

The diagram of Figure 1 has been drawn in its simplest form for the sake of explanation.

Figure 2 shows a modification in which either of the solenoids $w$ or $x$, when energised so as to draw up its core $w^1$ or $x^1$ respectively, interrupts the circuit of the other solenoid, while still enabling the dipping switch $o$ to close the circuit of the solenoid $w$ whether the control switch $s, t$ is closed or open. Current is supplied as before from line $k$ and switch $l$ to right headlamp $m$, and through dipping switch $o$ and contact $p$ to left headlamp $n$. When the dipping switch is operated it moves to contact $q$ breaking the circuit of the left headlamp $n$ and connecting line $k$ to solenoid $w$ for dipping the right headlamp reflector W toward the right.

The core $w^1$ of solenoid $w$ in this case carries a brush $w^2$ arranged to bridge contacts $z$ and $z^1$ in the circuit from contact $u$ of switch $t$ to coil $x$ so long as the core $w^1$ is free and the solenoid $w$ is not energised. When this solenoid is energised it draws up core $w^1$ interrupting the circuit of solenoid $x$ at contacts $z$ and $z^1$. Similarly, solenoid $x$ has a core $x^1$ with a brush $x^2$ arranged to bridge contacts $y$ and $y^1$ in the circuit from contact $r$ of switch $s$ to solenoid $w$, so long as the core $x^1$ is free and solenoid $x$ is not energised. When this solenoid $x$ is energised it breaks the circuit of solenoid $w$ from contact $r$ of switch $s$, leaving solenoid $w$ still connected to contact $q$ of the dipping switch $o$.

If arm $b$ of the signal switch is closed on contacts $d$ and $d^1$, the righthand signal arm is raised by its solenoid $f$ while it is illumined by its lamp $g$, and current is supplied through contact $d^1$ to switch $s$. If this switch is closed the current flows through contact $r$, contacts $y$ and $y^1$ to solenoid $w$ whose other end is grounded. As solenoid $w$ is energised it swivels and dips the reflector W of the right headlamp $m$ about the axis M and against the return spring $X^1$ in well known manner, and as its core $w_1$ is drawn up it breaks the circuit of solenoid $x$ at contacts $z$ and $z^1$. The left headlamp $n$ therefore continues to throw its beam of light straight ahead and only the beam of the right headlamp $m$ is dipped and swivelled to the right, as is desired.

If arm $c$ of the signal switch is closed on contacts $e$ and $e^1$, while control switch $s, t$ is closed, the left traffic arm is raised by its solenoid $h$ and is illumined by its lamp $i$. A circuit is also closed through contact $e^1$, and switch $t$, contact $u$, contacts $z$ and $z^1$ to solenoid $x$ whose other terminal is grounded. Solenoid $x$ is thus energised to swivel the reflector of the left headlamp $n$ to the left about the axis N and against the return spring $W^1$, while the raising of its core $x^1$ interrupts the circuit of solenoid $w$ at contacts $y$ and $y^1$. The lamp $m$ thus continues to throw its light beam straight ahead while only the beam of light from lamp $n$ is swivelled to the left.

If the dipping switch $o$ is operated, no matter whether the signal switch $b, c$ is closed on either of its set of contacts or not, and no matter whether the control switch $s, t$ is closed on its contacts or not, current flows from switch $l$ to switch $o$ which has now been moved over on to contact $q$. This supplies current directly to the solenoid $w$ which dips and swivels the reflector W of the right headlamp $m$, while the circuit of the left headlamp $n$ is broken at $p$. Energising of solenoid $w$ draws up its core $w^1$ breaking the circuit of solenoid $x$ whether this was energised before or not. Hence, the left headlamp is extinguished and the reflector W of the right headlamp $m$ is dipped and swivelled as is required. No current is wasted in the solenoid $x$ of left headlamp $n$ while the lamp is thus extinguished by operation of switch $o$.

It will be evident that the circuits illustrated represent the connections for operating the signal arms and the dipping or swivelling of the headlamp reflectors in their simplest form, and other refinements may be introduced in the circuits without departing from the scope of the invention as defined by the claims which follow.

I claim:

1. A control circuit for the turning indicators and headlamps of automobiles, comprising right and left signal arms each having electromagnetic operating means, right and left headlamps each having electromagnetic means for swivelling its light beam laterally toward the side at which such headlamp is located, a manual switch and contacts therefor adapted to close alternatively the circuits of said electromagnetic operating means of either the right or the left signal arm and also the circuits of the electromagnetic swivelling means of either said right or said left headlamp, means for supplying current to said headlamps, and a second switch with contacts for cutting out of circuit one of said headlamps and for closing simultaneously the circuit of said electromagnetic swivelling means of the other headlamp.

2. A control circuit for the turning indicators and headlamps of automobiles, comprising right and left signal arms each having electromagnetic operating means, right and left headlamps each having electromagnetic means for swivelling its light beam laterally toward the side at which such headlamp is located, a manual switch and contacts therefor adapted to close alternatively the circuits of said electro-magnetic operating means of either the right or the left signal arm and also the circuits of the electromagnetic swivelling means of either said right or said left headlamp, means for supplying current to said headlamps, a control switch adapted to close and to open circuits leading from the contacts of said manual switch to each of the electromagnetic swivelling means of said headlamps, and a second switch with contacts for cutting out of circuit one of said headlamps and for closing simultaneously the circuit of said electro-magnetic swivelling means of the other headlamp.

3. A control circuit for the turning indicators and headlamps of automobiles as claimed in claim 2, comprising also switch contacts in the respective circuits of said electromagnetic swivelling means adapted to break the circuits from the said control switch to the other of said electromagnetic swivelling means when one thereof is actuated.

4. A control circuit for the turning indicators and headlamps of automobiles as claimed in claim 2, wherein the electromagnetic swivelling means of each headlamp comprises a solenoid having a movable core carrying the bridging contact of a switch, each such switch being cross-connected in the circuit of the other solenoid in such manner that when one solenoid is energised the circuit of the other solenoid leading from said control switch is interrupted.

5. A control circuit for the turning indicators and headlamps of automobiles, comprising right and left signal arms each having electromagnetic operating means, right and left headlamps each having electromagnetic means for swivelling its light beam laterally toward the side at which such headlamp is located, a manual switch and contacts therefor adapted to close alternatively the circuits of said electro-magnetic operating means of either the right or the left signal arm and also the circuits of the electromagnetic swivelling means of either said right or said left headlamp, means for supplying current to said headlamps, a control switch adapted to close and to open circuits leading from the contacts of said manual switch to each of the electromagnetic swivelling means of said headlamps, bridging contacts in the circuits from said manual switch operable by said electromagnetic swivelling means and adapted to interrupt the circuit from said control switch to either of said electromagnetic swivelling means when the other thereof is actuated, and a separate switch having contacts and circuit connections for cutting out of circuit one of said headlamps and for closing simultaneously the circuit of said electromagnetic swivelling means of the other headlamps, irrespective of the position of said control switch.

JAMES CLIVE.

REFERENCES CITED

The following references are of record in the file of this patent:

UNITED STATES PATENTS

| Number | Name | Date |
| --- | --- | --- |
| 1,080,110 | Edward et al. | Dec. 2, 1913 |
| 1,629,342 | Jusahz | May 17, 1927 |
| 1,995,236 | Alcaraz | Mar. 19, 1935 |
| 2,258,069 | Rom | Oct. 2, 1941 |